Figure 1:
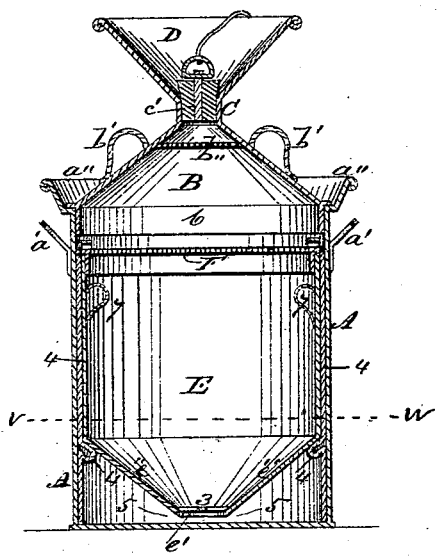

C. W. HOWARD.

Improvement in Wash Boilers.

No. 123,346.

Patented Feb. 6, 1872.

WITNESSES:

L. L. Cheney

Michau Sims

INVENTOR:

Charles W. Howard 123,346

UNITED STATES PATENT OFFICE.

CHARLES W. HOWARD, OF PHILADELPHIA, PENNSYLVANIA.

IMPROVEMENT IN WASH-BOILERS.

Specification forming part of Letters Patent No. 123,346, dated February 6, 1872.

Specification describing certain Improvements in Wash-Boilers, invented by CHARLES W. HOWARD, of the city of Philadelphia, in the State of Pennsylvania.

My improvements relate to that class of wash-boilers in which each consists of two concentrically-arranged vessels, the inner one, for containing the clothes, communicating at its top and bottom with the outer one, which is the water-boiler; and the first part of my invention consists in the construction of the bottom of the inner vessel in the form of an inverted hollow conical frustum, leaving the lower or smaller end open, and the top of the said vessel with a readily-removable co-extensive lid, of perforated sheet-metal or gauze-wire, all arranged in such a manner as to cause the boiling water rising between the said inner and outer vessels to flow over and become distributed by the perforated lid of the inner vessel over the whole upper surface of the mass of clothes in the vessel below, and to escape through the central opening in the latter at a point just above the middle of the bottom of the outer vessel; the object of this part of my invention being the production of a more intimate and thoroughly-penetrating action of the scalding water upon the clothes, and the better prevention of a counter or upward current of water through the bottom of the said inner vessel. The second part of my invention consists in the construction of the cover of the outer vessel in the form of a hollow conical frustum, with a perforated diaphragm fixed horizontally across near its upper end, in combination with a funnel or inverted hollow conical frustum, attached, by a hollow neck or short pipe, to the upper end of the conical cover, so as to produce a free communication between the latter and the funnel; the object of this part of my invention being twofold, first, to vent the vessels, and, at the same time, prevent the boiling water from being thrown out in spurts through the opening in the cover; and second, to cause the return of any water formed by the condensation of any vapor which may be allowed to enter the funnel. The third part of my invention consists in the construction of an upward-flaring guard around and in water-tight contact with the projecting upper edge of the outer vessel, so as to operate, in combination with the conical cover, for the purpose of returning any water which may be forced out around between the said vessel and cover. The fourth part of my invention consists in the construction and arrangement of guides and supports permanently fixed to the inner vertical sides of the outer vessel, so as to operate in combination therewith to keep the inner vessel concentric with the outer one, and also support the former with its bottom opening clear of the bottom of the outer vessel; the object of this part of my invention being to keep the inner vessel steady and firm, with an ample boiling-space between the bottoms of the two vessels and thin uniform spaces between the sides of the same, for the ascent of the boiling water to the upper side of the perforated lid of the inner vessel.

Figure 2:
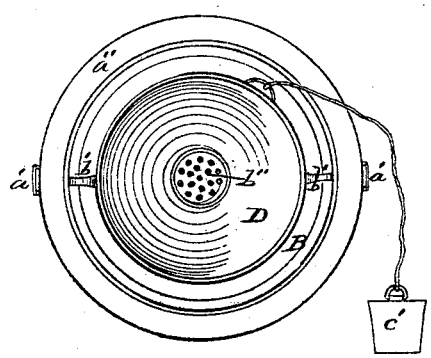
Figure 3:
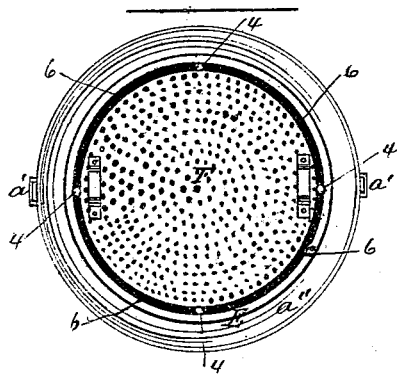
Figure 4:
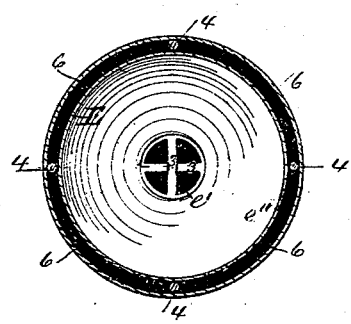

Figure 1 is a central vertical section of the whole wash-boiler embodying my invention, and Fig. 2 is a plan view of the upper end of the same. Fig. 3 is a plan view of the upper end of the boiler without the conical cover and funnel. Fig. 4 is a horizontal section below the dotted line $v\ w$ of Fig. 1.

The outer vessel A is made of sheet metal, has close sides and bottom and an open top. It has two handles, $a'\ a'$, one on each side near the top edge, and just above the handles the flaring guard $a''$ is secured, so as to leave the upper edge of the vessel A projecting sufficiently to serve as an annular bearing for supporting the cover B, the lower edge of which slips within the said projection, while the lower edge of the sloping sides of the cover rests directly upon the said projecting upper edge of the vessel A. The cover B, being a hollow conical frustum, communicates, through a short pipe, C, with the funnel D above. The pipe C is provided with a removable cork stopper, $c'$, so that the pipe C can be readily opened and closed, as either the escape or confinement of the steam may be desired. The cover is provided with two opposite handles, $b'\ b'$, for convenience in lifting and replacing, and the perforated diaphragm $b''$, for preventing the boiling water from being thrown out in spurts into the funnel, is secured at a short distance below the pipe C. (See Fig. 1.) The inner vessel E is also made of sheet metal, and has a small opening, $e'$, in its conical bottom $e''$, with two crossing bars, 3 3, fixed therein, which prevent any parts of the clothes from falling through the opening. The vessel has an open top, which is fitted with the perforated lid F, and is supported concentrically within the outer vessel A by means of guides and supports 4 4 4 4, of wire, fixed to the inner side of the vessel A, so as to afford a spacious boiling-chamber, 5, between its bottom and the bottom of the vessel A, and also thin open spaces 6 6 6 6 around between the sides of the two vessels, for boiling water to pass up and flow over the perforated lid F, which is about an inch (more or less) below the flange 6 of the cover B. Two handles, 7 7, are attached to the inner sides of the vessel E for lifting it.

In the operation of this boiler, the clothes are placed in the inner vessel E, the lid F applied thereon, and a sufficient quantity of water then poured into the outer vessel, the cover D applied, and the whole then placed over the fire. In boiling, water is forced up between the vessels A and E upon the perforated lid F, which spreads it over the whole upper side of the clothes, and, passing intimately through the same, escapes through the opening $e'$ in the conical bottom of E into the lower part of the outer vessel A, to be again sent upon the same circuit until the clothes are sufficiently scalded or boiled; and during this operation the excess of steam may be allowed to escape through the funnel, and any water of condensation that may be deposited therein or forced up in boiling will return by gravitation to the inner vessel below, and any water that may be forced up between the cover B and the flaring guard $a''$ will also return by gravitation.

I claim as my invention—

1. The inner vessel E, constructed with the open inverted hollow conical bottom $e''$ and perforated lid F, and arranged to operate, in combination with an outer vessel, A, substantially as and for the purpose hereinbefore set forth.

2. The hollow conical cover B, diaphragm $b''$, and opening $c'$, in combination with the funnel D, the said parts being constructed and arranged to operate, in relation to the vessels A and E, substantially as and for the purpose hereinbefore set forth.

3. The upward-flaring guard $a''$, fixed around the projecting upper edge of the vessel A, as described, in combination with the removable conical cover B, the said parts operating together as and for the purpose hereinbefore set forth.

4. The guides and supports 4 4 4 4, in combination with the inner side of the vessel A, the said guides and supports being constructed and secured to operate substantially as and for the purposes hereinbefore set forth.

CHARLES W. HOWARD.

Witnesses:
L. L. CHENEY,
MICHAEL QUIN.